(12) United States Patent
Vyas et al.

(10) Patent No.: US 7,680,822 B1
(45) Date of Patent: Mar. 16, 2010

(54) METHOD AND SYSTEM FOR AUTOMATICALLY CREATING AND UPDATING ACCESS CONTROLS LISTS

(75) Inventors: Ashutosh Vyas, Jodhpur (IN); Gaurav Jain, Alwar (IN); Madhusudhana H. S., Bangalore (IN)

(73) Assignee: Novell, Inc., Provo, UT (US)

( * ) Notice: Subject to any disclaimer, the term of this patent is extended or adjusted under 35 U.S.C. 154(b) by 1525 days.

(21) Appl. No.: 10/776,150

(22) Filed: Feb. 11, 2004

(51) Int. Cl.
*G06F 17/00* (2006.01)

(52) U.S. Cl. .................. 707/104.1; 707/9; 707/200; 709/225; 715/234; 713/152

(58) Field of Classification Search ............ 707/9, 707/200; 709/225, 220; 713/152, 164–5; 715/834
See application file for complete search history.

(56) References Cited

U.S. PATENT DOCUMENTS

| | | | |
|---|---|---|---|
| 5,950,195 A * | 9/1999 | Stockwell et al. ............... 707/4 |
| 6,041,347 A * | 3/2000 | Harsham et al. ............ 709/220 |
| 6,061,684 A | 5/2000 | Glasser et al. |
| 6,088,805 A * | 7/2000 | Davis et al. .................. 726/10 |
| 6,233,576 B1 * | 5/2001 | Lewis ............................ 707/9 |
| 6,484,261 B1 | 11/2002 | Wiegel |
| 6,647,388 B2 * | 11/2003 | Numao et al. .................. 707/9 |
| 7,143,288 B2 * | 11/2006 | Pham et al. ................. 713/165 |
| 2003/0088786 A1 | 5/2003 | Moran et al. |
| 2003/0120955 A1 | 6/2003 | Bartal et al. |
| 2003/0172145 A1 * | 9/2003 | Nguyen ...................... 709/223 |

OTHER PUBLICATIONS

Introduction for Access Control List (ACL) Tools, www.s4nets.com/PIX_tools_user_doc1.htm.
Cisco Works Access Control List Manager 1.4, Aug. 2, 2002, Cisco Systems, Inc. www.cisco.com/warp/public/cc/pd/wr2k/caclm/prodlit/aclm_ov.htm.

* cited by examiner

*Primary Examiner*—Sathyanarayan Pannala
(74) *Attorney, Agent, or Firm*—Haynes and Boone, LLP

(57) ABSTRACT

A method and system are provided for inserting access control rules into an access control list. The access control list may be configured to contain independent rule blocks having ordered access rules. In one example, the method includes creating a new independent rule block and inserting a new access rule into the block if the list is empty. If the list is not empty, a set of mapped independent rule blocks may be created from the list. For each block in the set, the method may attempt to determine a position for the new access rule. Those blocks for which a position cannot be determined may be removed from the set, and the blocks in the set may be merged to form a new independent rule block with the new access rule.

25 Claims, 3 Drawing Sheets

METHOD AND SYSTEM FOR AUTOMATICALLY CREATING AND UPDATING ACCESS CONTROLS LISTS

BACKGROUND

This disclosure relates generally to networked computing environments and, more specifically, to a method and system for automatically updating and creating access control lists.

Many computing resources now exist on networks. Files, programs, webpages, or data, for example, may be stored on a network and accessed remotely. The Internet, local area networks (LANs), wide area networks (WANs), wireless networks, and intranets, for example, may have items for which remote access is desired.

Policies dictating access rights may be used with some network resources. Access control rules may be used to enforce policies and permissions regarding access to various network resources. Such access control rules may be grouped into access control lists (ACLs). ACLs may need to be properly ordered and maintained to ensure that the ACL enforces the desired policy for the network. Generally, maintenance of ACLs may be awkward and may use approaches that require specialized knowledge of decision trees or languages. Furthermore, such approaches may not support incremental changes, further adding to the burden of maintaining the ACLs.

Therefore, what is needed is a system and method that addresses the above-identified issues.

DETAILED DESCRIPTION

Figures 1, 2:
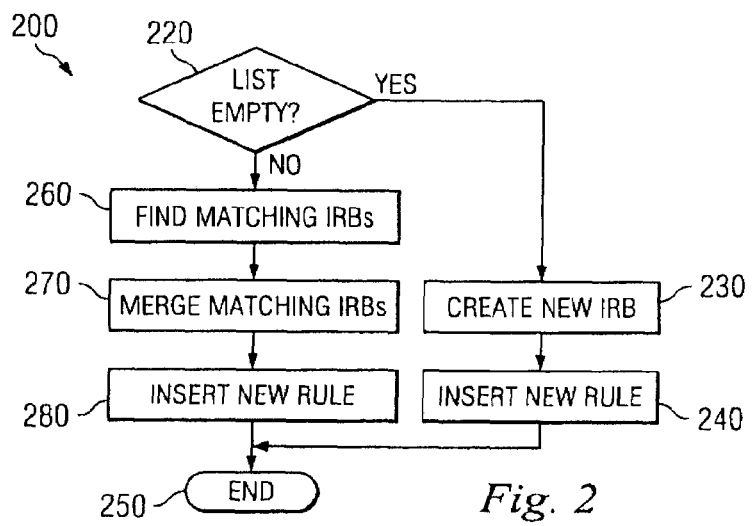
FIG. 1 is a block diagram of an access control list.
FIG. 2 is a flow chart illustrating one embodiment of a method for inserting an access control rule into an access control list.

The present disclosure relates generally to networked computing environments and, more specifically, to a method and system for automatically creating and updating access control rule lists. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, a block diagram of an access control list (ACL) 100 is illustrated. The ACL 100 may include one or more independent rule blocks (IRBs) 110, 120, 130. The IRBs 110, 120, 130 may each include an ordered group of access rules (e.g., Rule 1 and Rule 2 of 110). Here D1, D2 . . . , $D_m$ correspond to the domain of traffic attributes. Traffic attributes may be a source user of an access request, a source or destination address of a machine, or an associated protocol, port, or time of a request, for example. $A_r$ defines an action domain of the rules, which may be either "allow," "deny," or other actions. The ACL 100 may be accessed in sequential order for each access request to find the first mapped rule. The action defined in the first mapped rule may be applied for that request. The order of the rules in the IRBs may be created and maintained by a creation/insertion method as will be described in greater detail below.

The access rules, Rule 1, Rule 2, . . . , Rule i, within each block 110, 120, 130 may include an expression of one or more access control policies. The access control policies may be access policies for various network resources, for example. The access control rules Rule 1, Rule 2, . . . , Rule i, may be applied to incoming and/or outgoing access requests. Each access control rule, Rule 1, Rule 2, . . . , Rule i, may be defined in terms of attributes, Attr1, Attr2, . . . , Attrm, which may fall under attribute domains D1, D2, . . . , Dm, and an associated action, e.g., Action 1, for each rule, which may fall under the action domain Ar. All rules in an ACL may have the same attribute prototype.

An access request may include various attributes, which may fall under attribute domains, D1, D2, . . . , Dm, and may match the attributes of a given rule. An action (e.g., Action1) may be applied for an access request if all the attributes of the request satisfy the rule-attributes Attr1, Attr2, Attrm, for a given rule. For example, Rule 1 of IRB 1 may express a policy that hypertext transfer protocol (http) sites may not be viewed between 9 AM and 5 PM. The rule corresponding to this policy may be expressed in terms of its attributes, {service, time} as, R1: {http, 9 AM-5 PM}→deny. This rule would not be applicable to an access request to view an http site at 7:00 PM, for example. In such case, the remainder of the ACL 100 may be examined in search of an applicable rule. However, an access request to view an http site at 12:30 PM would match the rule and may be denied without further processing of the ACL 100.

In some instances, more than one rule may be used to adequately express a given access policy. For example, a policy such as, "all http requests from employee X to any destination except www.xyz.com between 8:00 PM and 12:00 AM are allowed," may employ a first rule, R1: {X, http, www.xyz.com, 8 PM-12 AM}→deny, followed by a second rule, R2: {X, http, any, 8 AM-12 AM}→allow. Here Rule 1 and Rule 2 may need to be processed in order for the original policy to be properly enforced. Thus, any new rules that may be inserted, or rules that may be deleted, may create a need to monitor or modify the ACL 100 in order to ensure that existing policy is not disturbed or contradicted. Additionally, without monitoring, rules may be inserted that are redundant.

In the present embodiment, to aid in maintaining the ACL 100, relationships may exist between rules that are helpful to recognize. Two rules may be said to be different rules if they are defined in different contexts. The context, or context space, of a rule refers the set of domain of attributes that a rule expresses. For example, the rule, R1: ({X,Y},{ftp,http},{9 AM-5 PM})→allow is defined in the context space of user $\epsilon${X,Y} and service $\epsilon${ftp, http} and time $\epsilon${9 AM-5 PM}. The rule, R2=({X,Z},{ftp,http},{3 PM-9 PM})→allow, having a context space of user $\epsilon${X, Y} and service={ftp, http} and time $\epsilon${3 PM-9 PM}, has a different context than R1 since the user domains and time domains are different.

Two contexts are disjoint if at least one of their attribute domains is mutually disjoint (e.g., different). For example, context 1: {user=X, Y} and {service=ftp, http} and {time=9 AM-5 PM} and context 2: {user=Z} and {service=ftp, http} and {time=9 AM-5 PM} are disjoint since the user domains are different. One context may overlap another. For example, context 1: {user=X,Y} and {service=ftp} and {time=9 AM-5 PM} and context 2: {user=Y} and {service=ftp, http} and {time=3 PM-8 PM} overlap since there is a common context, {user=Y; service=ftp; time=3 PM-5 PM}, for all attributes. One context may also cover another. For example, context 1: {user=X,Y} and {service=ftp, http} and {time=9 AM-5 PM} covers context 2: {user=Y} and {service=http} and {time=3 PM-5 PM} since the domain of all attributes in context 2 are also defined in context 1. It may be said of this latter example that context 2 is a subset of context 1.

As previously stated, the ACL 100 of FIG. 1 may include IRBs 110, 120, 130. Each IRB may have the property that each access rule within an IRB containing two or more access rules overlaps with at least one other rule in the same IRB. The IRBs may also have the property that each access rule within a given IRB is disjoint with each access rule of any other IRB.

Referring to FIG. 2, a flow chart illustrating one embodiment of a method 200 for inserting an access control rule into an access control list is illustrated. The method 200 may used as an iterative ACL creation and insertion tool to maintain the ACL 100 in a consistent state (e.g., having no redundancies or conflicts with policy).

In step 220, the list 100 may be determined to be empty, or may be determined to already contain one or more access control rules. The rules may be disposed in one or more independent rule blocks. If the list is determined to be empty in step 220, a new IRB may be created in step 230. The new rule may be inserted in step 240 and the IRB may contain only the new rule being inserted. If the list is not determined to be empty in step 220, the list may contain at least one IRB already. In this case, all the IRBs in the list which map to the new rule may be located. The new rule may be said to map to each IRB in the list that contains at least one rule with which the new rule is not disjoint (e.g. the two rules have an overlapped context as previously described).

The new rule may map to only a single IRB, or it may map to multiple IRBs. In the case of the new rule mapping to multiple IRBs, the IRBs may need to be merged into a single new IRB in step 270. An exemplary method for merging the mapped IRBs will be described in greater detail below with respect to FIG. 3. The mapped IRBs may be merged in such a way that redundancies and contradictions are not created, or are removed, as will be described below. Following the merging of the mapped IRBs in step 270, or concurrently with the merging, the new rule is inserted into the new IRB in step 280. The position of the new rule within the new rule block may be based on its position within the merged blocks as described in greater detail below.

Figure 3:
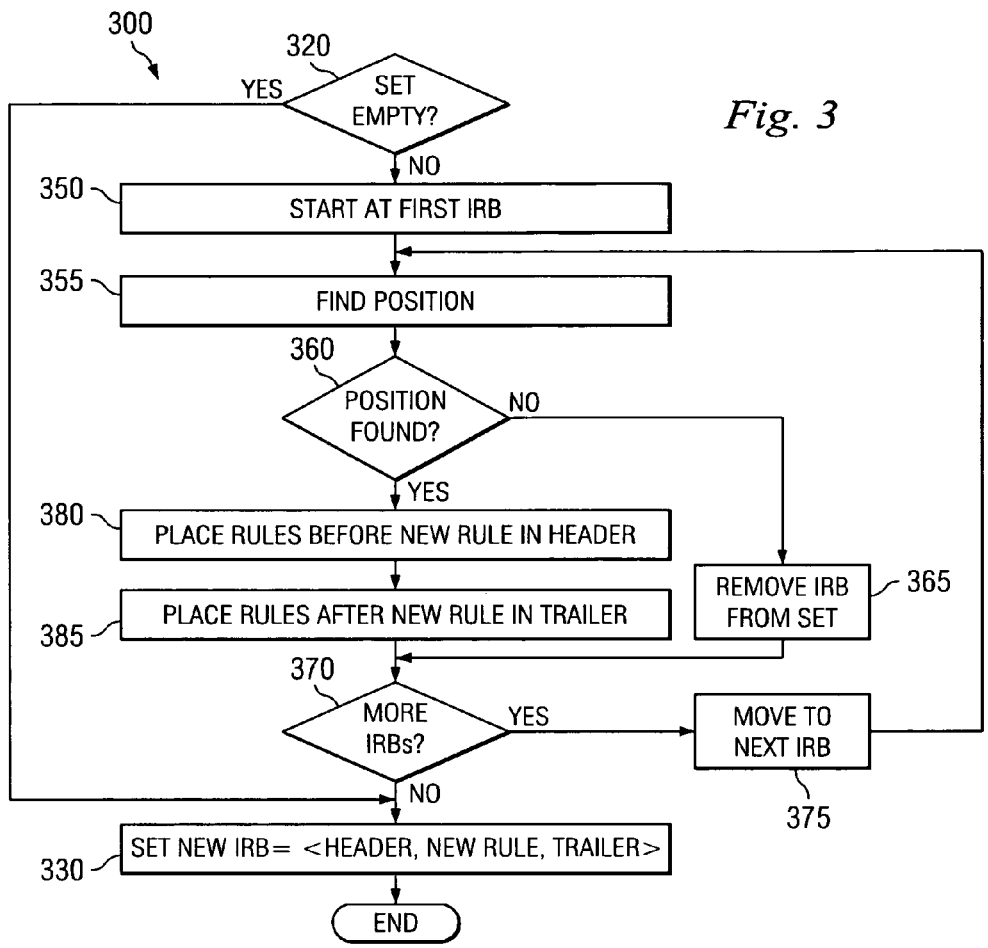
FIG. 3 is a flow chart illustrating one embodiment of a method for merging independent rule blocks.

Referring to FIG. 3, a flow chart of one embodiment of a method 300 for merging independent rule blocks and inserting a new rule is illustrated. In some embodiments, the method 300 may incorporate both the merging step 270 and insertion step 280 of FIG. 2. The method 300 may also function as an insertion method to form a new independent rule block. For example, if the set of mapped IRBs is determined to be empty in step 320 (e.g., there may be no mapped IRBs), a new IRB formed in step 330 may include a header, the new rule, and a trailer. However, in the case of an empty mapped set of IRBs in step 320, the header and trailer may contain nothing and the new IRB may include only the new rule in step 330.

If the mapped IRB set is determined to be not empty in step 320, starting with the first IRB in step 350, which may be any IRB in the set, a position within the IRB for the new rule may be found in step 355. The position within the IRB for the new rule may be a position that does not introduce redundancies or contradictions. This may involve resolving conflicts, or removing redundant and/or conflicting rules from the IRB before a position for the new rule may be determined. One method for determining a position for a new rule within an IRB will be described in greater detail below with respect to FIG. 4. In some instances, there may be no position for a new rule within an IRB. For example, the rule may not map to an IRB or it may map to an IRB but be redundant. If this is determined in step 360, yet the IRB is be needed to enforce a desired access policy, the IRB may be removed from the mapped set in step 365, and hence may not be merged but will remain within the ACL 100.

In a case where a position can be found for the new rule as determined in step 360, the IRB may be divided into a header and a trailer. The header may be the ordered list of all the rules in the IRB which have a position ahead of the new rule as determined in step 355. The trailer may be the ordered list of rules which have a position behind the new rule as determined in step 355. In step 380, the header from the current IRB may be placed following the header or headers from any previous IRB evaluations. In step 385, the trailer from the current IRB may be placed following the trailer or trailers from any previous IRB evaluations.

The process of evaluating IRBs in step 355 (to find a position for the new rule) and either splitting the IRB and adding it to the header in step 380 and/or trailer in step 385, or discarding it from the mapped set in step 365 may be repeated until there are no IRBs remaining in the set as determined in step 370. The new IRB, including the new rule, may then be formed in step 330 by creating a new IRB from the header, followed by the new rule, followed by the trailer. As stated previously, it is possible for the header, trailer, or both to be empty sets.

Figure 4:
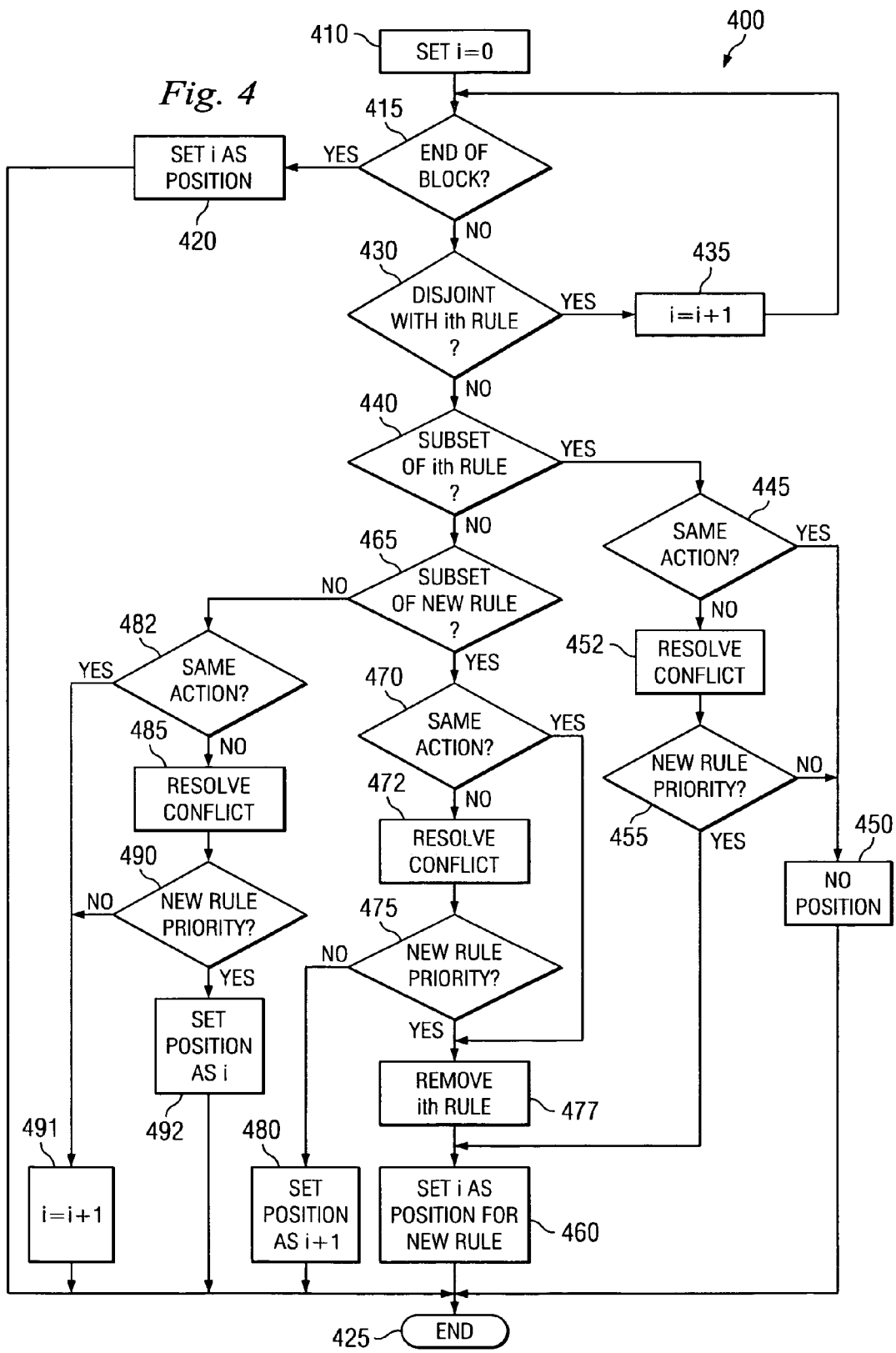
FIG. 4 is a flow chart illustrating one embodiment of a method for determining a position for an access rule in an independent rule block.

Referring to FIG. 4, a flow chart of one embodiment of a method 400 for determining a position for an access rule in an IRB is illustrated. A counter variable may be used (e.g., i) beginning in step 410 to traverse the ordered list of rules within an IRB. If i represents the end of the IRB as determined in step 415, the may be no position for the new rule in step 420. If i does not represent the end of the IRB as determined in step 415, the current rule (the ith rule in the IRB) may be tested for a disjoint context with the new rule in step 430. If the two rules are disjoint, the counter i may be incremented in step 435, and the process may return to 415. If the two rules are determined to be not disjoint in step 430, a determination may be made as to whether the new rule is a subset of the ith rule in step 440. If so, a determination may be made as to whether the two rules perform the same action in step 445. If so, there may be no position in the IRB for the new rule in step 450. If the two rules do not perform the same action as determined in step 445, there may be a conflict which may be resolved in step 452. If the new rule takes priority as determined in step 455, i may be the position of the new rule in step 460. In other words, the new rule takes the ith position and the ith rule moves to the (i+1)th position. If the ith rule takes priority in step 445, there may be no position in the IRB for the new rule.

Returning to step 440, if the new rule is not a subset of the ith rule, but instead the ith rule is a subset of the new rule as determined in step 465, and the two rules perform the same action as determined in step 470, the ith rule may removed in step 477 and i may be the position of the new rule in step 460. If the two rules do not perform the same action as determined in step 470, there may be a conflict that may be resolved in step 472. If the new rule takes priority as determined in step 475, the ith rule may be removed and i may be the position of the new rule. In other words, the new rule takes the ith position and the ith rules moves to the (i+1)th position. If the ith rule takes priority as determined in step 475, the position of the new rule may be set to i+1.

In the case where neither rule is a subset of the other as determined in steps 440 and 465 and the two rules do not perform the same action as determined in step 482, a conflict may be resolved in step 485. If the new rule takes priority as determined in step 490, i may become the position for the new rule. If the two rules perform the same action as determined in step 482 or if the ith rule takes priority as determined in step 490, i may be increment in step 491 and the process may repeat.

The process of resolving conflicts, or determining a priority, in steps 452, 472, and 485 may be based on user input as the ACL 100 is being created or updated. The user may have the option of deciding during modification of the ACL 100 which of two conflicting rules to keep and enforce. The priority decisions may also be based on predefined rules. For example, the newer rule may always take priority, reflecting a presumption that the newer rule reflects a newer or changed access policy. It is also possible for rules to be defined for some conflicts and to request user input or selection for other conflicts.

The process of removing rules (e.g., step 477) may not require any user intervention or reordering of the remaining access rules. The removal of a rule as in step 477, or the removal of a rule from the ACL 100 in other situations, may be done by locating the rule and removing it from its IRB. The location of a rule may be determined based on a unique identifier or ID number for each rule, for example, or a location may be based on other querying or location techniques.

The insertion method 300, and position determining method 400 may be flexible in that any number of attributes may be added to update an ACL policy. IRBs may enable rule blocking, which may speed up finding a matching rule. Well-known techniques of prioritization may be utilized for even faster processing. Because each IRB may be independent, the IRBs may be placed in any position within the ACL 100. However, the IRBs may also be arranged based on frequency of access to reduce average search times and increase overall performance of the ACL 100.

The examples illustrated show access rules based on binary outcomes such as "allow," or "deny." However the ACL 100 may also be configured to allow a greater variety of outcomes. For example, a "redirect request" rule or a "log access attempt" rule may also be utilized in the ACL 100 to extend the capabilities of the ACL 100.

Figure 5:
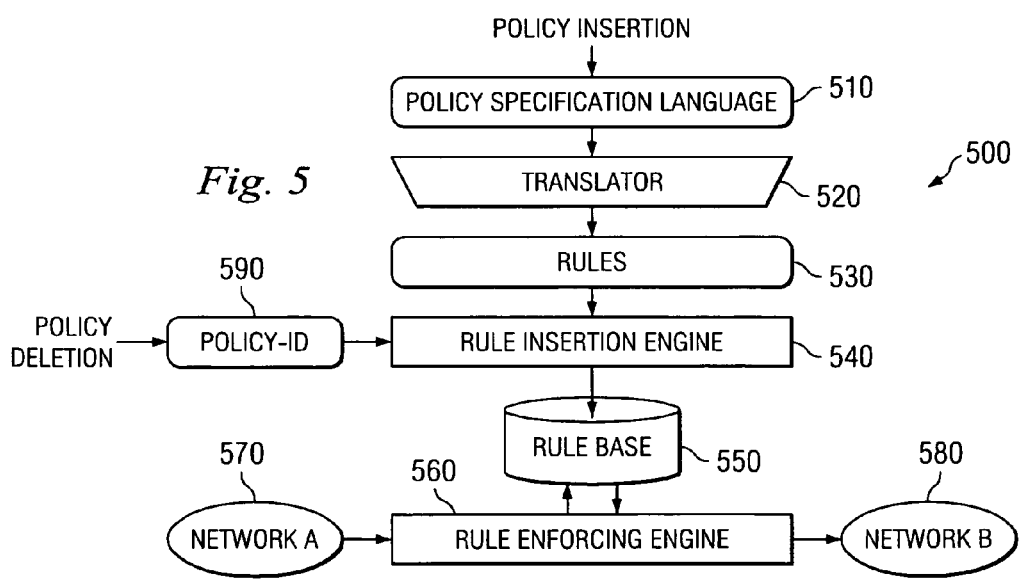
FIG. 5 is a diagram of an exemplary computing environment in which an access control list may be implemented.

Referring to FIG. 5, a diagram of an exemplary environment 500, in which an access control list may be used. A user may enter an access control policy using a policy specification language 510 and a translator 520 may convert the policy into one or more access control rules 530, which may be passed to a rule insertion engine 540. The rule insertion engine may update or create an ACL (e.g., the ACL 100 of FIG. 1), which may be stored in a rule base 550. A rule enforcing engine 560 may monitor network traffic and allow or deny access requests from network 570 to network 580 based on the result of accessing the rule base 550, for example. The user may delete an access policy by entering a policy id 590. The rule insertion engine 540 may remove the corresponding access control rules from the rule base 550. Although one-way communication is shown between the various components of environment 500, it is understood that two-way communication may also be possible along each communication path.

The policy specification language 510 and translator 520 may be used to enter access policies which result in a rule-based specification. The policy specification language 510 may be a meta-language, for example. The translator 520 may be a compiler for policy statements defined in a meta-language. A GUI (not shown) may also be used, which accepts attributes and their ranges in addition to the decisions supported for the ACL 100. Other methods or tools may be used to generate the rules 530, or they may be generated manually. The policy specification language 510, translator 520, and rule insertion engine 540 may be software based and executable on a processor, which may be part of a larger computer system. A computer system may include, but is not limited to, a personal computer (PC), a server, a terminal, a personal digital assistant (PDA), or a mobile phone. The computer system may also make use of volatile memory such as RAM, for example, and non-volatile memory such as a hard disk drive or a flash memory device, for example.

The access rules 530 may be access control rules as previously described. The rule insertion engine 540 may create or update ACLs based on the methods previously described, which may prevent redundancies, conflicts, or other disorders of the access rules. The rules in the ACL 100 may be stored in a rule base 550. The rule insertion engine 540 and the rule base 550 may be hardware or software based and may be executable on a processor or computer system as previously herein described. The rule base 550 may also be a remotely stored database accessible via a network, such as a local area network (LAN), a wide area network (WAN), a wireless network, or the Internet, for example.

The rule enforcing engine 560 may be software or hardware based and may reside on the same system, or a different system, than the rule base 550. The rule enforcing engine may also reside on a router or network access point, for example. The rule enforcing engine 560 may check access requests, such as an access request from network 570 to network 580. An access request may be checked against the ACL 100 stored in the rule base 550 to determine whether to allow or deny the request. The networks 570, 580 may be single computers, or processors, a single networked resource, or an entire network. Similarly, the rule enforcing engine 560 may interact with more networks or devices than shown.

An access policy or a single access control rule may be removed from the rule base 550 by the rule insertion engine 540 as previously described. Policy deletion 590 may be a part of the same or different componentry as previously described with respect to rule insertion. Policy deletion may be hardware or software based, for example, and may be executable on a processor or computer system.

Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A computer implemented method for inserting a new access rule into an access control list for enforcing policies and permissions for controlling access to various network resources, the list configured to contain independent rule blocks having ordered access rules, the method comprising:

if the list is empty, creating a new independent rule block and inserting the new access rule therein;

if the list is not empty, creating from the list a set of mapped independent rule blocks;

for each block in the set, attempting to determine a position for the new access rule;

removing from the set those blocks for which a position cannot be determined; and merging the blocks in the set to form a new independent rule block and inserting the new access rule therein;

and applying the access rules in the list to enforce policies and permissions to control access to various network resources.

2. The computer implemented method of claim 1 wherein creating from the list a set of mapped independent rule blocks comprises selecting all blocks in the list having at least one rule that is not disjoint with the new access rule.

3. The computer implemented method of claim 1 wherein attempting to determine a position for the new access rule comprises:

comparing each existing rule in the rule block to the new access rule; and if all existing rules have been compared against the new access rule and no determination has been made, and if the new access rule is not disjoint with at least one existing rule in the rule block, determining a position for the new access rule that is at the end of the block, otherwise, determining that there is no position for the new rule in the rule block.

4. The computer implemented method of claim 3 wherein comparing each existing rule in the rule block to the new access rule comprises:

if the two rules are disjoint, continuing to the next comparison;

if the new access rule is a subset of the existing rule and the two rules perform the same action, determining that there is no position in the block for the new access rule;

if the new access rule is a subset of the existing rule and the two rules do not perform the same action, resolving the conflict between the new access rule and the existing rule;

if the existing rule is a subset of the new access rule and the two rules perform the same action, determining a position for the new access rule that is in the place of the existing rule and removing the existing rule from the block;

if the existing rule is a subset of the new access rule and the two rules do not perform the same action, resolving the conflict;

if the new access rule and the existing rule are not disjoint, neither is a subset of the other, and the two rules have the same action, continuing to the next comparison; and if the new access rule and the existing rule are not disjoint, neither is a subset of the other, and the two rules do not have the same action, resolving the conflict.

5. The computer implemented method of claim 4 wherein resolving the conflict if the new access rule is a subset of the existing rule and the two rules do not perform the same action further comprises:

if the new access rule takes priority, determining a position for the new access rule that is immediately before the existing rule; and if the existing rule takes priority, removing the block from the set of mapped independent rule blocks.

6. The computer implemented method of claim 4 wherein resolving the conflict if the existing rule is a subset of the new access rule and the two rules do not perform the same action further comprises:

if the new access rule takes priority, determining a position for the new access rule that is in the place of the existing rule and removing the existing rule from the block; and if the existing rule takes priority, designating a position in the block for the new access rule that is immediately behind the existing rule.

7. The computer implemented method of claim 4 wherein resolving the conflict if the new access rule and the existing rule are not disjoint, neither is a subset of the other, and the two rules do not have the same action further comprises:

if the new access rule takes priority, placing the new access rule in a position occupied by the existing rule; and if the existing rule takes priority, continuing to the next comparison.

8. The computer implemented method of claim 4 wherein resolving the conflict comprises establishing a priority based on predefined rules.

9. The computer implemented method of claim 4 wherein resolving the conflict comprises establishing a priority based on user input.

10. The computer implemented method of claim 1 wherein merging the blocks in the set to form a new independent rule block and inserting the new access rule therein comprises:

placing all rules from every block in the set which are positioned ahead of the new access rule in front of the new access rule in the new block; and placing all rules from every block in the set which are positioned after the new access rule behind the new access rule in the new block.

11. The computer implemented method of claim 1 further comprising removing an existing rule, wherein the removing includes:

searching for the existing rule to be removed based on an identification number associated with the existing rule; and removing the rule.

12. A system comprising:

a computer system including a processor;

a rule base, stored on a computer-readable medium, containing an access control list configured to hold independent rule blocks having ordered access rules, the rules for enforcing policies and permissions for controlling access to various network resources;

a rule enforcing engine, executed by the processor, for enforcing the rules in the access control list to control access to various network resources; and a rule insertion engine, executed by the processor, configured to execute instructions for inserting a new access rule into the access control list, the instructions comprising:

if the access control list is empty, creating a new independent rule block and inserting the new access rule therein; and if the access control list is not empty, creating from the access control list a set of mapped independent rule blocks;

if the set is empty, creating a new independent rule block and inserting the new access rule therein; and merging the blocks in a subset of the set comprising those blocks for which a position for the new access rule can be determined, and inserting the new access rule therein.

13. The system of claim 12 wherein creating a set of mapped independent rule blocks comprises evaluating each independent rule block in the access control list and determining whether there is an existing access rule in the independent rule block that is not disjoint with the new access rule.

14. The system of claim 12 wherein determining a position for the new access rule comprises:

comparing each existing rule in the independent rule block to the new access rule; and if all existing rules have been compared against the new access rule and no position has been determined, designating a position for the new access rule that is at the end of the block.

15. The system of claim 14 wherein comparing each existing rule in the independent rule block to the new access rule comprises:

if the two rules are disjoint, continuing to the next comparison;

if the new access rule is a subset of the existing rule and the two rules perform the same action, determining that there is no position in the block for the new access rule;

if the new access rule is a subset of the existing rule and the two rules do not perform the same action, determining a priority between the new access rule and the existing rule;

if the existing rule is a subset of the new access rule and the two rules perform the same action, determining a position for the new access rule that is in the place of the existing rule and removing the existing rule from the block;

if the existing rule is a subset of the new access rule and the two rules do not perform the same action, determining a priority between the existing rule and the new access rule;

if the new access rule and the existing rule are not disjoint, neither is a subset of the other, and both have the same action, continuing to the next comparison; and if the new access rule and the existing rule are not disjoint, neither is a subset of the other, and the two rules do not have the same action, determining a priority between the existing rule and the new access rule.

16. The system of claim 15 wherein determining a priority comprises the use of predetermined rules.

17. The system of claim 15 wherein determining a priority comprises accepting user input to determine priority.

18. The system of claim 12 wherein removing the rule comprises searching for the rule to be removed based on an identification number associated with the rule and removing the rule.

19. The system of claim 12 wherein merging the blocks in a subset comprises:

placing all rules from every block in the subset which have a position ahead of the rule being inserted in front of the new access rule in the new block; and placing all rules from every block in the subset which have a position after the new access rule being inserted behind the new access rule in the new block.

20. A computer readable medium comprising computer executable instructions for inserting a new access rule into an access control list containing independent rule blocks having ordered access rules for enforcing policies and permissions for controlling access to various network resources, the instructions comprising:

creating a new independent rule block and inserting the rule therein if the list is empty;

creating from the list a set of mapped independent rule blocks if the list is not empty;

determining a position for the new access rule for each block in the set and removing from the set those blocks for which a position cannot be determined; and merging the blocks in the set to form a new independent rule block and inserting the rule therein; and applying the rules to enforce policies and permissions regarding access to various network resources.

21. The computer readable medium of claim 20 wherein creating the set of mapped independent rule blocks includes selecting all blocks in the list having at least one rule that is not disjoint with the new access rule.

22. The computer readable medium of claim 20 wherein determining a position for the new access rule includes comparing each existing rule in the rule block to the new access rule and, for each comparison:

if the two rules are disjoint, continuing to the next comparison;

if the new access rule is a subset of the existing rule and the two rules perform the same action, determining that there is no position in the block for the new access rule;

if the new access rule is a subset of the existing rule and the two rules do not perform the same action, resolving the conflict between the new access rule and the existing rule, and if the new access rule takes priority, assigning a position of the existing rule to the new access rule, and if the existing rule takes priority, not assigning a position to the new access rule;

if the existing rule is a subset of the new access rule and the two rules perform the same action, assigning a position of the existing rule to the new access rule;

if the existing rule is a subset of the new access rule and the two rules do not perform the same action, determining which of the new access and existing rules has priority and, if the new access rule takes priority, assigning a position of the existing rule to the new access rule, and if the existing rule takes priority, assigning a position in the block for the new access rule that is immediately behind the existing rule;

if the new access rule and the existing rule are not disjoint, neither is a subset of the other, and the two rules do not have the same action, determining which of the new access and existing rules has priority and, if the new access rule takes priority, assigning a position of the existing rule to the new access rule; and if all existing rules have been compared against the new access rule and no determination has been made, determining a position for the new access rule that is at the end of the block.

23. The computer readable medium of claim 21 wherein determining which of the new access and existing rules has priority is based at least partly on user determined criteria.

24. The computer readable medium of claim 20 wherein merging the blocks in the set to form a new independent rule block and inserting the rule therein comprises:

placing all rules from every block in the set which have a position ahead of the rule being inserted in front of the new access rule in the new block; and placing all rules from every set which placed after the rule being inserted behind the new access rule in the new block.

25. The computer readable medium of claim 20 wherein removing the rule comprises searching for the rule in the list based on a unique identification number and removing the rule.

* * * * *